(12) United States Patent
Herman et al.

(10) Patent No.: US 6,604,769 B2
(45) Date of Patent: Aug. 12, 2003

(54) TOWING PLATE

(75) Inventors: Mark A. Herman, Landisville, PA (US); Jeffrey R. Kauffman, Lancaster, PA (US); Jeffrey M. Klibert, Lancaster, PA (US)

(73) Assignee: Lift-All Co., Inc., Landisville, PA (US)

( * ) Notice: Subject to any disclaimer, the term of this patent is extended or adjusted under 35 U.S.C. 154(b) by 0 days.

(21) Appl. No.: 10/056,195

(22) Filed: Dec. 20, 2001

(65) Prior Publication Data

US 2003/0116984 A1 Jun. 26, 2003

(51) Int. Cl.$^7$ ................................................ B66C 1/10
(52) U.S. Cl. ................................. 294/82.12; 24/116 R
(58) Field of Search ............................ 294/82.1, 82.11, 294/82.12, 82.17, 74; 24/116 R; 59/93

(56) References Cited

U.S. PATENT DOCUMENTS

| | | | | |
|---|---|---|---|---|
| 569,448 A | * | 10/1896 | Dudley | 294/82.12 |
| 1,326,969 A | * | 1/1920 | Rounds | 294/82.12 |
| 2,703,476 A | * | 3/1955 | Donaldson | 59/93 |
| 2,721,757 A | * | 10/1955 | Anderson | 294/81.2 |
| 2,820,661 A | * | 1/1958 | Koons et al. | 294/82.12 |
| 3,486,783 A | | 12/1969 | Allen, Jr. | 294/74 |
| 4,068,467 A | * | 1/1978 | Schreyer et al. | 59/93 |
| 4,241,575 A | | 12/1980 | St. Germain | 59/93 |
| 4,248,469 A | | 2/1981 | Knox | 294/78 A |
| 4,429,526 A | * | 2/1984 | Rehbein | 59/93 |
| 4,941,698 A | | 7/1990 | Klibert et al. | 294/82.12 |
| 5,713,695 A | | 2/1998 | Rogers | 404/25 |

FOREIGN PATENT DOCUMENTS

SE    108409    * 9/1943 ................ 294/74

* cited by examiner

*Primary Examiner*—Dean J. Kramer
(74) *Attorney, Agent, or Firm*—Martin Fruitman

(57) ABSTRACT

The invention is a plate with three holes to function as a winch line attachment point and a length and angular adjustment for a chain attached to separated locations on a vehicle. One large hole is used to receive the winch line hook, and two smaller holes with angularly oriented chain locking slots are used to adjust the length of the chain attached to the towed vehicle. The material around the holes is reduced to the minimum size necessary to safely meet the rated towing capacity so that the weight of the plate is minimized.

5 Claims, 1 Drawing Sheet

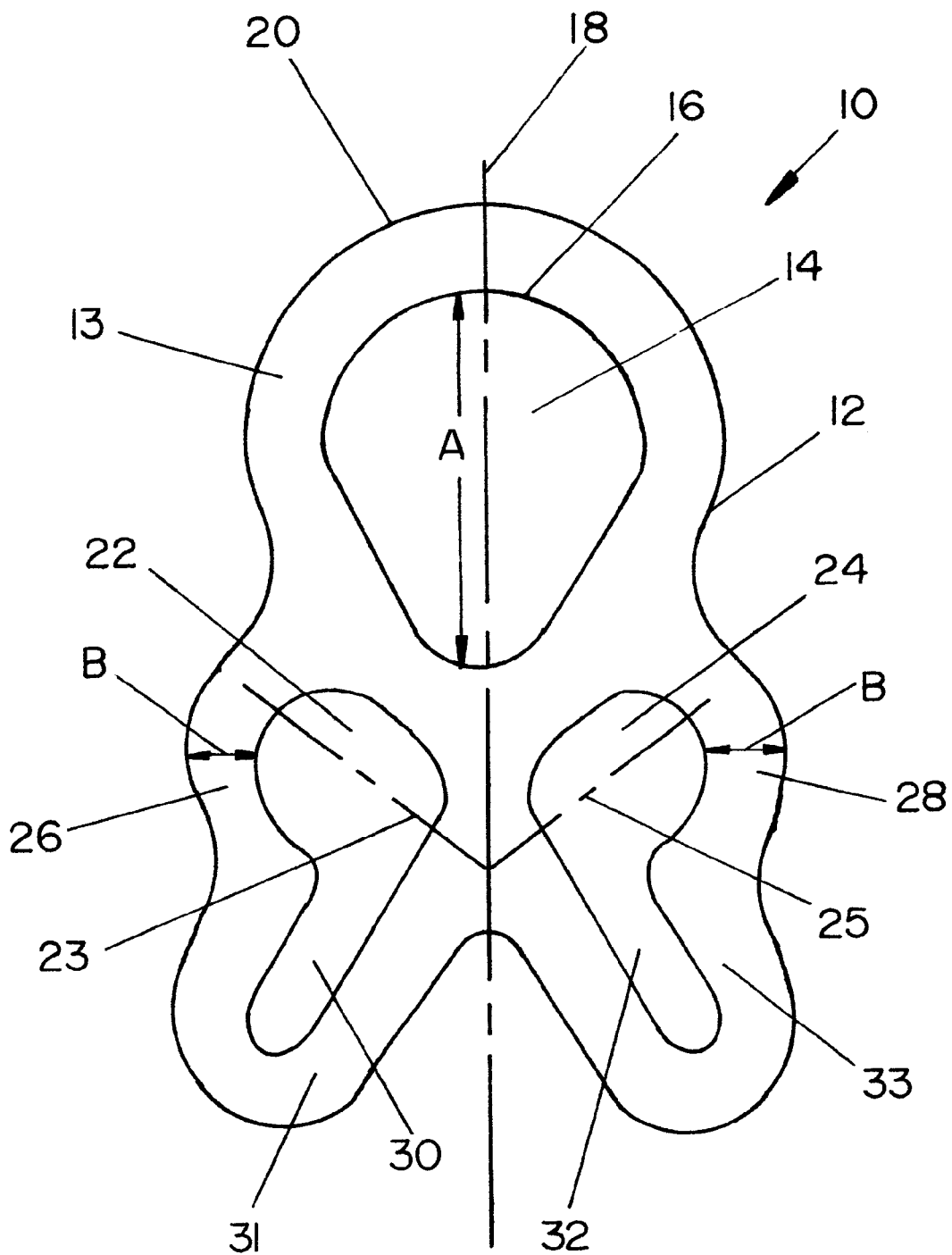

TOWING PLATE

BACKGROUND OF THE INVENTION

This invention deals generally with vehicle towing and more specifically with a towing plate for receiving a winch line hook and adjusting the length of the chain that is attached to the vehicle.

Although many people have had the distressing experience of having a vehicle they were driving require towing, few understand the complications of accomplishing that task. Even with the use of so-called "roll-back trucks" it is necessary to hook chains to the disabled vehicle, and those chains should be attached to or encircle more than a single point on the disabled vehicle, even though the tow vehicle or tie down point on the roll-back platform uses only a single winch line. This usually involves a set of chains which is more complicated than the layperson appreciates.

The prior art means for adapting a winch line from the towing vehicle or roll-back platform to the multiple attachment points on the disabled vehicle is called a "V" chain assembly. This configuration of chains involves an oblong center ring to which two separate lengths of chain are permanently attached. Small grab hooks are also attached to the same end link of each chain which is attached to the center ring, and a cluster of differently shaped fixtures are permanently attached to the chains at the ends of the chains remote from the center ring. The cluster of fixtures includes "J" hooks, "R" hooks, and "T" hooks all of which are conventional devices well known in the art. In use, the winch line from the tow truck or the tie-down platform is attached to the center ring, and the other two chains are wrapped around the disabled vehicle attachment points, or the hooks are attached directly to the disabled vehicle. In either case, the grab hooks near the center ring are attached to selected links of the chains to adjust the length of the segments of the chains.

Although such "V" chain assemblies work satisfactorily for the tasks of towing or tying down a disabled vehicle, those who regularly use them have come to appreciate their limitations. First of all, the "V" chain assemblies are very heavy. Furthermore, the inclusion of the grab hooks in the assembly make it very likely that the assembly will become severely tangled upon itself anytime it is stored.

It would be very beneficial to have available an adapter assembly which has less weight than the typical "V" chain assembly and which would not require grab hooks to be dealt with at all times.

SUMMARY OF THE INVENTION

The present invention reduces the weight of tow chain assemblies and reduces the likelihood of tangling. The invention is a towing plate which functions both as a center ring for attachment of the tow vehicle's winch line and as a device for adjusting the length of the "V" chains to be attached to the disabled vehicle. Actually, the towing plate uses only a single chain to serve as both "V" chains and eliminates the need for the conventional grab hooks. Thus, the single chain of the assembly can be stored like any other individual chain with less chance of tangling. Moreover, even if the single chain does become tangled upon itself, it is much easier to untangle because it is merely a single chain with only end hooks.

These benefits are accomplished by the design of the towing plate of the invention. The towing plate is somewhat longer than it is wide and has three holes that are balanced across the centerline of the long dimension of the plate. The shape and dimensions of the plate are essentially determined by maintaining a specified minimum width of material around each hole. In the preferred embodiment, for a ⅜ inch thick plate of 4130/4140 steel, the width of material around each hole is approximately one half inch, and this design of the plate safely yields a rated 4200 pounds towing capacity. The dimension for the width of material around each hole can actually be determined by conventional calculations for any material, plate thickness, and required towing capacity.

In the preferred embodiment, one large pear shaped hole is centered between the sides of the plate with the large end of the hole near the plate's edge at one end of the centerline of the plate. Two smaller oblong holes with rounded ends are located near the narrow end of the larger hole in a configuration that is balanced relative to the centerline of the plate, and with the long sides of the smaller holes oriented at equal but opposite angles to the centerline of the plate. The smaller holes have slots extending away from the large hole from their edges most remote from the large hole, with the slots oriented at an angle to the centerline of the plate, so that the combination of the smaller holes and the slots take on the shape of the heads of golf clubs.

The size of the large hole is determined by the requirement that the links and the hook of the tow chain must freely pass through it. The curve of the large hole nearest to the edge of the plate is rounded in the conventional manner so that it accepts a conventional hook.

The sizes of the two smaller holes are determined by the requirement that while the links of the chain must freely pass through the holes, the dimensions of the holes must be too small to permit the hooks on the chain to pass through the holes. This structure is attained by putting the chain through both smaller holes before attaching the hook or cluster of hooks to at least one end of the chain.

The slots extending from the smaller holes are conventional chain locking slots. That is, the slots are dimensioned to permit individual links of the chain to slide into them when the link's planar orientation is parallel to the slot and to prevent adjacent links oriented in different planes from moving through the slot. The length of the slot is selected to maintain the link within the slot. An important feature of the smaller holes is that each has a slot and that the slots extend from the two holes at an angle to each other. This angle causes the remote ends of the chain locked into the slots to deviate from each other as is desirable for attachment to the separated points on the disabled vehicle to which the remote ends of the chain are to be attached.

The present invention therefore furnishes a towing plate which reduces the weight of the towing chain assembly and reduces the tangling when the assembly is stored, while maintaining ease of use and full safety.

BRIEF DESCRIPTION OF THE DRAWING

The FIGURE is a plan view of the preferred embodiment of the towing plate of the invention.

DETAILED DESCRIPTION OF THE INVENTION

The preferred embodiment of the invention is shown in the FIGURE in a plan view of towing plate 10. In the preferred embodiment, towing plate 10 is formed from flat plate 12 which is a ⅜ inch thick plate of 4130/4140 steel, has a shape that is symmetrical around centerline 18, and has three holes formed in it.

In the preferred embodiment as shown in the FIGURE, the shape of towing plate 10 is formed to generally follow the configuration determined by the three holes, and its size is determined by maintaining a specified minimum width of material around each hole. Thus, for the preferred embodiment, and in order to attain a 4200 pound rated towing capacity, the width of material in section 13 which is around large hole 14 is approximately ½ inch for ⅜ inch thick plate 12. Similarly, the widths B of sections 26 and 28 between holes 22 and 24 and the edges of plate 12 and the widths of sections 31 and 33 around slots 30 and 32 are also approximately ½ inch. These sections around the holes and slots can be determined by conventional calculations and are based on the desired rated towing capacity and the thickness and material of the plate 12. However, in any case, if the weight of towing plate 10 is to be minimized, it is desirable to form plate 12 to follow the curves determined by its three holes and to use the smallest material width around the holes that is consistent with safety.

Larger hole 14 has a pear shape, but the basic requirement of hole 14 is twofold. One requirement is that one edge 16 of hole 14 is on centerline 18 of plate 12, is located adjacent to one edge 20 of plate 12, and is conventionally curved to accept a winch line hook (not shown). The second requirement is that at least one dimension of hole 14 permits a hook (not shown) on the end of the winch line which is to be used with plate 12 to freely pass through hole 14. In the preferred embodiment shown in the FIGURE, this large dimension of hole 14 is dimension A along centerline 18, thus causing the pear shape of hole 14.

Towing plate 10 also includes two smaller holes 22 and 24. Holes 22 and 24 are of equal size and are located equally spaced from large hole 14 and from centerline 18, so that they form a balanced configuration across centerline 18. In the preferred embodiment shown in the FIGURE, holes 22 and 24 are oblong shaped with their longest axes 23 and 25 intersecting plate axis 18 at equal but opposite angles.

The dimensional requirements for holes 22 and 24 are determined by the size of the chain (not shown) which is to be attached to towing plate 10. Holes 22 and 24 have dimensions which permit the links of the chain with which towing plate 10 is used to pass through holes 22 and 24 only under certain conditions. The sizes of holes 22 and 24 are selected so that the holes are small enough to prevent the chain used with towing plate 10 from fitting through the holes when the chain is under tension, that is, when the links are firmly held at 90 degrees to each other. However, the holes are also large enough so that when the links are not under tension and can turn slightly relative to each other, the chain will go through the holes.

The chain (not shown) is assembled to towing plate 10 by threading it through either hole 22 or 24 and then back through the other hole before the fixtures are attached to at least one end of the chain. Once the end fixtures are permanently attached to both ends of the chain, towing plate 10 and the chain are permanently interconnected.

Holes 22 and 24 also have chain locking slots 30 and 32 extending from the edges of the holes most remote from large hole 14. Chain locking slots 30 and 32 extend away from their respective holes at equal but opposite angles to centerline 18 of towing plate 10. The dimensions of slots 30 and 32 are determined by the conventional criteria for such chain locking slots based on the chain with which they are to be used. The width of the slots is selected so that any link of the chain will fit into the slot when the link is oriented with its plane transverse to plate 12, and the width of the slot is also chosen so the when a link is positioned within the slot, the adjacent links can not move through the slot. These are the requirements for any conventional chain locking slot.

However, slots 30 and 32 have two other requirements. First, the lengths of both slots must be oriented at equal angles to axis 18, so that-the chain locked within them can be extended away from tow plate 10 at equal angles to axis 18. Therefore, the chain's ends can be easily attached to separated locations on the towed vehicle while being subjected to equal forces. Furthermore, the length of slots 30 and 32 should be equal to or greater than the outside width of the links of the chain used with the towing plate in order to reduce the likelihood of a link slipping out of the slot when towing plate 10 is used, as is typical, in a horizontal position. The slots provide the ability to shorten the length of one or both of the chain sections extending from the slots to better equalize the forces on the chain segments.

Towing plate 10 of the invention and a single chain used with it thereby provide a light weight, highly versatile, assembly for attaching the single chain from the towing vehicle to a "V" shaped chain configuration which can be attached to widely separated points on a disabled vehicle, but can be easily stored without likelihood of tangling the assembly.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, towing plate 10 can be made in various sizes, and the three holes can have various shapes, provided they meet the size requirements.

What is claimed as new and for which Letters patent of the United States are desired to be secured is:

1. A towing plate for connecting a single winch line to a chain attached to separated points on a vehicle comprising:
    a plate with a centerline, a first edge and a second edge intersecting the centerline at opposite ends of the plate, and two side edges on opposite sides of the centerline, with the edges shaped to form a structure that is balanced on opposite sides of the centerline;
    a first hole formed in the plate, the hole formed so that it is balanced across the plate centerline and has a curved edge intersecting the plate centerline, with the curved edge spaced from the first edge of the plate so that the curved edge and the first edge of the plate form a structure that can accept a hook with which the towing plate is used;
    second and third holes formed in the plate in a balanced configuration across the centerline and located between the first hole and the second edge of the plate; and
    two chain locking slots, one slot extending from an edge of each of the second and third holes that is remote from the first hole and extending toward the second edge of the plate, with the slots oriented as balanced across the plate centerline, at equal complimentary angles to the plate centerline, and separating as they approach the second edge of the plate;
    wherein the portions of the plate between the holes between the slots and the edges of the plate, and between the holes and the edges of the plate are reduced in width to a minimum dimension consistent with the rated safe towing capacity of the towing plate.

2. The towing plate of claim 1 wherein the first hole has at least one dimension that permits the hook used with the towing plate to pass freely through the first hole.

3. The towing plate of claim 1 wherein the chain locking slots have a width selected so that links on a chain used with the towing plate will fit into the slots when the links are oriented transverse to the plate and so that when a link is positioned in a slot, adjacent chain links can not move through the slot.

4. The towing plate of claim 1 wherein the chain locking slots have lengths equal to or greater than the outside width of the links of a chain used with the towing plate.

5. The towing plate of claim 1 wherein the dimensions of the second and third holes are selected so that links of a chain used with the towing plate will pass through the second and third holes, but fixtures on the end of the chain will not pass through the second and third holes.

* * * * *